(No Model.) 2 Sheets—Sheet 1.
E. P. LYNCH.
WHEEL CULTIVATOR.
No. 329,921. Patented Nov. 10, 1885.
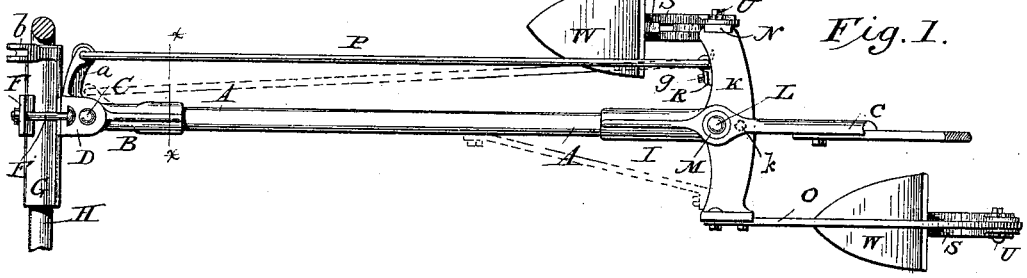
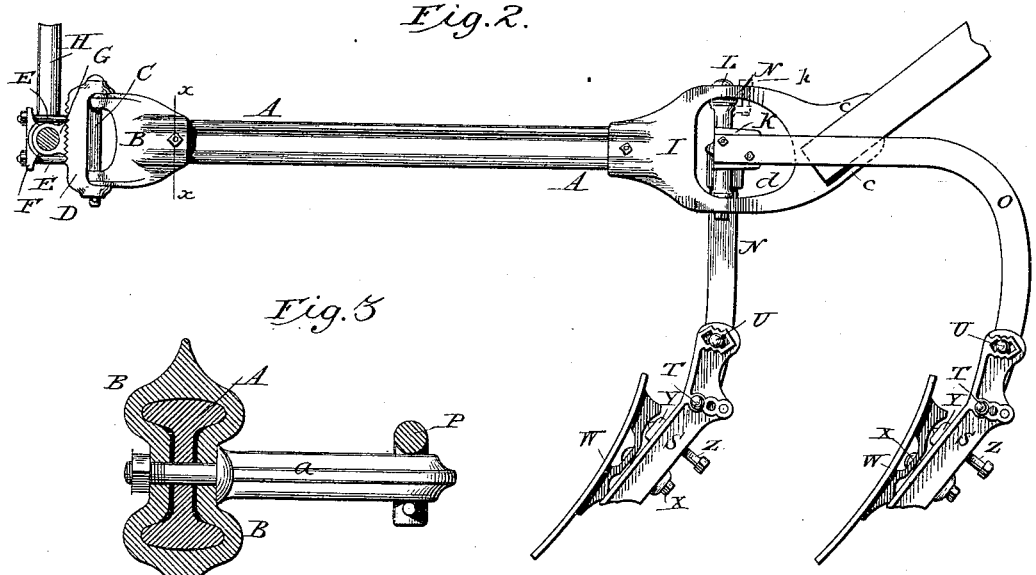
Attest
Sidney P. Hollingsworth
Wm. E. Kennedy
Inventor.
E. P. Lynch
By P. T. Dodge
Atty (No Model.) 2 Sheets—Sheet 2.

E. P. LYNCH.
WHEEL CULTIVATOR.

No. 329,921. Patented Nov. 10, 1885.

Attest:
Sidney P. Hollingsworth
Wm. F. Kennedy

Inventor:
E. P. Lynch,
By P. T. Dodge, Atty

UNITED STATES PATENT OFFICE.

EDWARD P. LYNCH, OF DAVENPORT, IOWA.

WHEEL-CULTIVATOR.

SPECIFICATION forming part of Letters Patent No. 329,921, dated November 10, 1885.

Application filed August 24, 1885. Serial No. 175,141. (No model.)

*To all whom it may concern:*

Be it known that I, EDWARD P. LYNCH, of Davenport, in the county of Scott and State of Iowa, have invented certain Improvements in Wheeled Cultivators, of which the following is a specification.

My invention relates to that class of wheeled cultivators in which the shovels are jointed to beams or drag-bars in such manner that they may swing laterally therewith without changing the horizontal angle of their operative faces with reference to the line of progression, as represented, for example, in Letters Patent of the United States granted to Reid, No. 290,111, dated December 11, 1883.

The object of the invention is to simplify and strengthen the operative parts, provide a compensation for wear in the joints, to give a stability and ease of action not attainable under the ordinary construction, to provide for the vertical adjustment of the beams at their forward ends in order to change the vertical inclination of the shovel faces or depth of cultivation, and to provide for the convenient adjustment of the shovels with reference to their standards, and for the adjustment of the standards with reference to the beams.

My improvements are applicable to various cultivators of otherwise ordinary construction.

In the accompanying drawings, I have represented but one beam and its connections, inasmuch as the second beam at the opposite side of the machine will be constructed in like manner.

Figure 6:
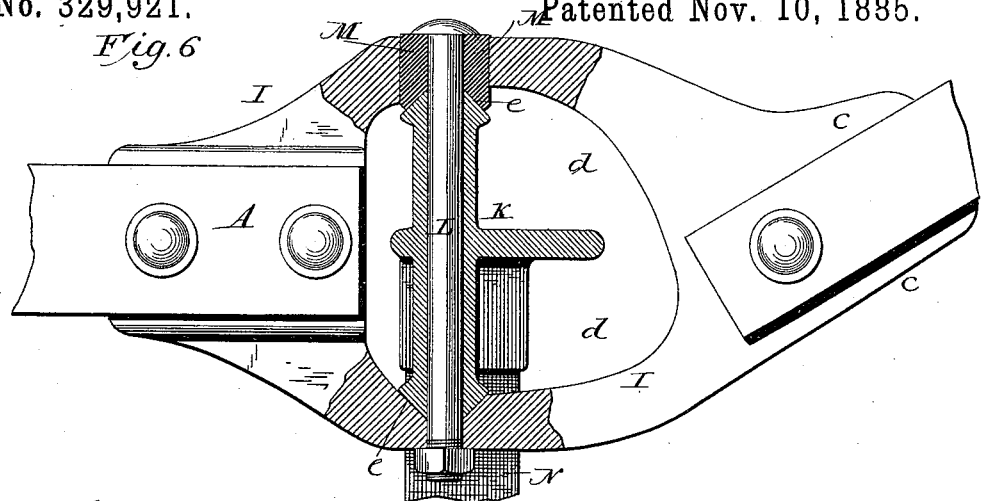
Figure 7:
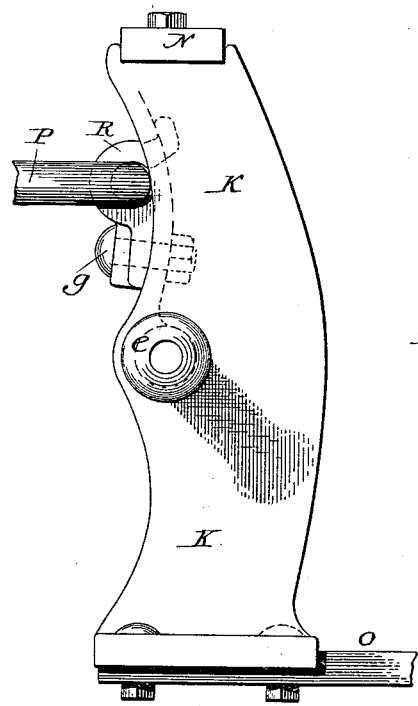
Figure 9:
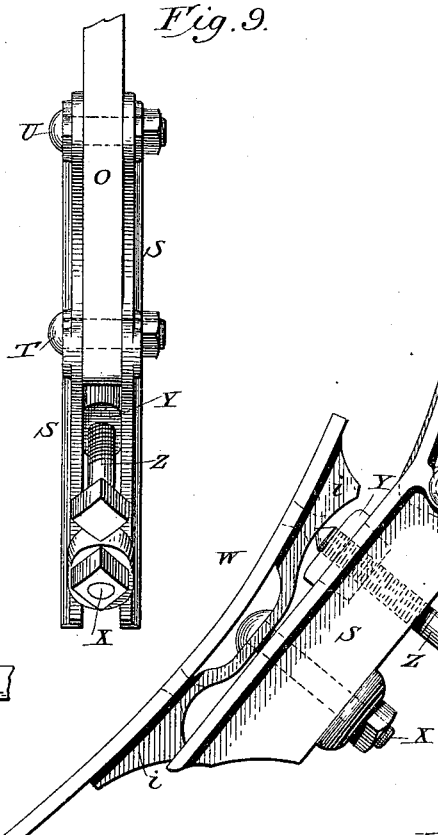
Figure 8:
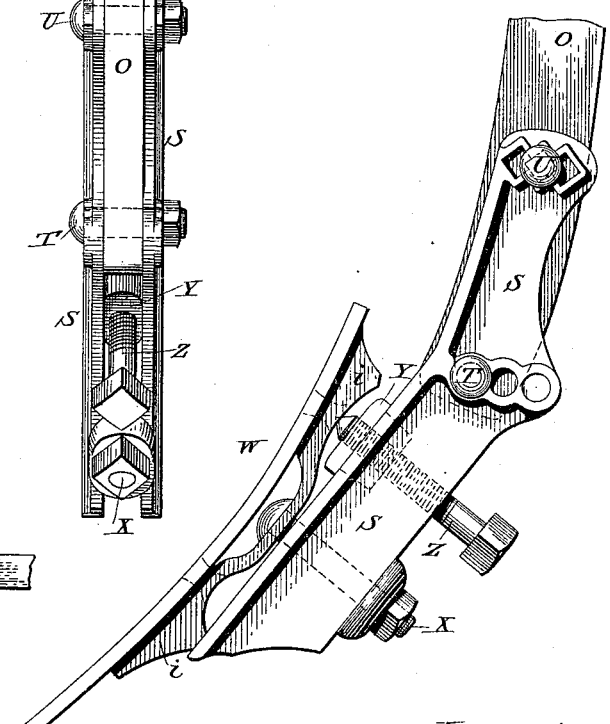
Figure 10:
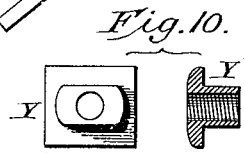

Figure 1 represents a top plan view of the beam and the parts operating directly in connection therewith. Fig. 2 represents a side elevation of the same, the main axle being shown in cross-section. Fig. 3 is a section on the line $xx$, Figs. 1 and 2, showing the forward end of the beam proper and the head to which it is attached. Fig. 4 is a longitudinal vertical section through the center of the devices, by which the beam is coupled to the axle, which is also shown. Fig. 5 is a top plan view of the forward part of the draft-head. Fig. 6 is a longitudinal central vertical section through the coupling at the rear end of the beam, by which the shovel standards and handles are carried. Fig. 7 is a top plan of the parts represented in the preceding figure. Fig. 8 is a side elevation of one of the shovels and its standard attached to the beam. Fig. 9 is a rear elevation of the same. Fig. 10 is a view showing in plan and vertical section the nut used in adjusting the shovel.

Referring to the drawings, A represents the beam or drag-bar, which may be of wood or metal, and of any appropriate form in cross-section, although I recommend a metallic beam of an I form, such as represented in the drawings, it having been found in practice that a beam of this form may be made of minimum weight with strength or stiffness in the required directions. The forward end of the beam I bolt rigidly to a plate, B, which is inserted between the arms of a forked plate or draw-head, D, and connected thereto by a vertical pivot-bolt, C, in order that the rear end of the beam may swing laterally. The plate D, which is provided with a lateral rigid arm, $a$, for a purpose hereinafter described, has its forward face notched or serrated transversely, and seated firmly against the rear serrated face of a horizontal sleeve or pipe-box, G, which revolves loosely upon a horizontal axle, H, so that the beam may swing vertically. The plate D is secured firmly but adjustably to the pipe-box by means of bolts E, passing through said plate above and below the sleeve, and through a bearing-plate, F, seated against the forward side of the sleeve. By loosening the bolts the parts may be released, so as to admit of their adjustment lengthwise of the sleeve to vary the distance between the beams. The sleeve may be provided, as shown, with an arm, $b$, to co-operate with beam-lifting springs of any of the various forms at present known in the art; or springs may be otherwise combined with said arm in any known way, these features constituting no part of the present invention.

The bolts E are seated in a vertical slot in the plate D, this construction permitting the plate to be adjusted vertically with reference to the sleeve in order to raise or lower the forward end of the beam, and thus control the inclination of the shovels as the nature of the soil may demand.

The plate B may have its rear end of any form adapted to receive the beam; but I recommend that it be constructed in the form of a socket, as shown in Fig. 3, so that the beam may be thrust endwise therein and secured firmly by means of a single bolt.

To the rear end of the beam I bolt or rivet firmly a casting, I, of the form plainly represented in Figs. 1, 2, and 6. This casting has a rearward extension, $c$, to receive the handle J, which is bolted thereto, and is also provided with a central transverse opening, $d$, through which there is extended a swiveling plate or block, K, of the form shown in Figs. 1, 2, 6, and 7. This block is provided midway of its length with a vertical opening to receive a pivot-bolt, L, by which it is secured within the casting I. At its upper and lower sides the block K has conical bearing-surfaces $e$, projecting therefrom around the bolt, the lower bearing being seated directly in a seat in the casting I, and the upper bearing in a seat in the lower end of a short tube, M, which is inserted tightly into a hole or seat in the casting and confined in place by means of the bolt. The use of the tube, which may be lifted, permits the block K to be inserted to its place, and also permits of the bearing surfaces being drawn together to compensate for wear, and thus maintain a close fit of the parts. The swivel-block K is adapted at its two ends to receive, respectively, the upright shovel-standard N and the horizontal shovel-standard O, which are bolted thereto.

The swiveling block is connected by the rod P to the arm $a$, which extends, as before mentioned, from the side of the stationary plate D, this connection constituting what is commonly known in the art as a "parallel movement," whereby the block K and the shovel-standards carried thereby are caused to move laterally with the beam A as the latter swings about its vertical axis C, but compelled to retain their original angle or inclination with reference to the axle and to the line of progression. In other words, the motion prevents the block K and the shovels from swinging in such manner as to incline the shovel-faces laterally out of the required position.

The rod O may be jointed to the swiveling block in any appropriate manner; but I prefer to provide the block with an eye-plate, R, constructed and applied as shown in Fig. 7, one end being inserted into a cavity in the block and the opposite end secured by a bolt, $g$. The employment of this plate permits the block to be cast without difficulty. The employment of the two shovel-standards, one of which has its end attached horizontally, while the other has its end attached vertically of the block, is advantageous in that it permits the height of the vertical standard and its shovel to be conveniently changed at will with relation to the other parts, the standard being secured by bolts or otherwise to the block, which should be provided, as shown, with flanges to assist in retaining the standard in place.

For the purpose of carrying the shovels, I attach to the lower end of each standard a shank, S, which is slotted or recessed longitudinally in order that its upper end may embrace the standard and that its lower end may receive the shovel-adjusting bolts. I connect this shank to the standard by means of a transverse pin or bolt, T, passed through one of a series of holes in the shank. The upper end of the shank is provided with a transverse slot, $h$, having notched or serrated edges to engage with the corners of an angular bolt, U, which passes through the standard and the two sides of the shank, as shown.

I am aware that it is old to provide a series of holes in the top of a shank to admit the fastening-bolt; but such construction would not permit the series of small adjustments which are secured under my construction.

I am also aware that it is old to provide the upper end of the standard with a smooth slot adapted to receive the bolt. The construction herein shown combines the advantage of permitting the slight adjustments attained by the slot with the rigid locking of the parts attainable by the use of separate holes.

The shovel W is provided on its back with a plate, $i$, bearing at one end on the shank, and secured to the shank by a bolt, X, seated at its head in said plate, and extended thence through the lower end of the shank and through a bearing-plate and nut thereon. To change the position or inclination of the shovel with respect to the vertical, I seat in the forward edge of the shank, behind the shovel, a flanged nut, Y, such as shown in Fig. 10, and clasp a bolt, Z, through the shank and through its nut against the rear side of the shovel or plate thereon. By adjusting the bolts Z and X the shovel may be given any required inclination and secured firmly in place.

Under certain conditions encountered in practice it is desirable to lock the shovel-standards rigidly to the beam, so that the shovels may partake of its swinging motion and change their horizontal angle with reference to the line of progression, as in machines of the ordinary types. To this end I provide for detaching or changing the position of the rod P and securing the swivel-block K for the time being rigidly to the beam, either by means of the rod or by bolts, latches, or equivalent fastening devices, such as will be suggested by the skill of the mechanic.

In Fig. 1 the dotted lines represent the rod P as disconnected from the fixed plate or head B and hooked into an ear on the beam head or plate B, thus locking the block K rigidly to the beam. In Figs. 1 and 2, $k$ represents a bolt or pin, which may be used in place of or in addition to the rod arranged as just described to lock the block K rigidly to the beam. Still another means to the same end is shown at $y$, Fig. 1, which represents a rod or brace bolted or otherwise secured to the block and to the beam.

The essence of the invention in this regard consists in the provision of means whereby the support for the shovel-standards may be locked rigidly to the beam or compelled to act with a swiveling effect at will, and the skilled mechanic will understand that the details may be variously modified, and that the improvement is applicable when the block or arm K is constructed and jointed to the beam in any of the various forms known in the art.

Having thus described my invention, what I claim is—

1. In a cultivator of the class herein specified, the shovel-carrying block K, in combination with the beam A and rod P, jointed thereto, the axle, the single sustaining-plate jointed to the rod and beam, and the clamping devices, substantially as shown, connecting said block to the axle, and having lateral and vertical adjustment thereon.

2. In combination with the swivel-block K, the beam A, and the rod P, the plate D, having both the beam and the rod jointed thereto, the axle, and intermediate devices, substantially as shown, connecting the plate with the axle and permitting its vertical adjustment in relation thereto, whereby the beam and the rod may be raised and lowered simultaneously and without changing their relative positions.

3. The axle, the rotary block or sleeve G thereon, the plate D, secured to and adjustable vertically on the sleeve, the beam A, and rod P, both jointed to said plate, and the block K, jointed to both the beam and the rod and provided with shovel-standards.

4. In combination with the sleeve or bearing G and intermediate fastening-bolts, the vertically-slotted plate D, provided with the side arm, a, substantially as and for the purpose described.

5. In combination with the swinging beam, the plate I, having the opening therethrough, the block K, extended through said opening and connected by a vertical pivot to the plate, and the swinging rod jointed to the block.

6. In combination with the block having the shovel-standards attached, the encircling and sustaining plate I, adapted, substantially as described and shown, to receive the beam, and the handle.

7. The plate I, provided with the central opening, and the conical step or bearing, in combination with the block K, having conical bearings, the bearing-ring M, and the bolt L.

8. The standard-supporting block K, provided with the detachable plate or clip R, in the form and manner described.

9. The laterally-swinging beam and the block K, to carry the shovel-standards, jointed to the beam, and means, substantially as described, for locking the block rigidly to the beam at will.

10. In combination with the swinging beam, the standard-supporting block K, swiveled to the beam, and the rod P, adjustable, substantially as described, to prevent or to compel the swiveling action of the block with reference to the beam, as circumstances may demand.

11. In combination with the supporting-standard, the pivot, and the hollow shovel-shank provided with the series of holes to receive the pivot, and another series of holes or slots to receive the adjusting-bolt.

12. The hollow shank, in combination with the shovel bearing at one point thereon, the bolt X, acting to draw the shovel toward the standard, the nut Y, seated in the standard, and the bolt Z, passing through said standard and acting to force the shovel from the standard.

In testimony whereof I hereunto set my hand this 10th day of July, 1885, in the presence of two attesting witnesses.

EDWARD P. LYNCH.

Witnesses:
L. L. HOLCOMB,
S. H. DWIGHT.